United States Patent [19]

Erickson et al.

[11]  4,026,715

[45] * May 31, 1977

[54] GLASS COMPOSITIONS, FIBERS AND METHODS OF MAKING SAME

[75] Inventors: Thomas D. Erickson, Newark; Warren W. Wolf, Reynoldsburg, both of Ohio

[73] Assignee: Owens-Corning Fiberglas Corporation, Toledo, Ohio

[ * ] Notice: The portion of the term of this patent subsequent to Nov. 12, 1991, has been disclaimed.

[22] Filed: Aug. 22, 1974

[21] Appl. No.: 499,722

Related U.S. Application Data

[63] Continuation-in-part of Ser. No. 340,982, March 19, 1973, Pat. No. 3,847,627, which is a continuation-in-part of Ser. No. 298,702, Oct. 18, 1972, abandoned, which is a continuation-in-part of Ser. No. 248,360, April 28, 1972, abandoned.

[52] U.S. Cl. .................................... 106/50; 106/52
[51] Int. Cl.² ...................... C03C 13/00; C03C 3/04
[58] Field of Search .............................. 106/50, 52

[56] References Cited

UNITED STATES PATENTS

| | | |
|---|---|---|
| 3,095,311 | 6/1963 | Wranau .............................. 106/50 |
| 3,673,049 | 6/1972 | Giffen et al. ......................... 106/52 |
| 3,783,092 | 1/1974 | Majumdar ............................ 106/50 |
| 3,847,626 | 11/1974 | Erickson et al. ..................... 106/50 |
| 3,847,627 | 11/1974 | Erickson et al. ..................... 106/50 |
| 3,876,481 | 4/1975 | Erickson et al. ..................... 106/50 |

*Primary Examiner*—Patrick P. Garvin
*Assistant Examiner*—William G. Wright
*Attorney, Agent, or Firm*—John W. Overman; Raymond E. Scott; Patrick P. Pacella

[57] ABSTRACT

This disclosure relates to fiberizable glass compositions, fibers and the method of making textile glass fibers which are boron and fluorine free. Boron and fluorine have now been recognized as potential pollutants in the manufacture of fiberizable glasses and glass fibers and the following disclosure eliminates these pollutants by substituting $TiO_2$, MgO and ZnO in the basic three component glass composition of $SiO_2$, $Al_2O_3$ and CaO. The preferred glass composition consists essentially of, by weight, 54.5 to 60% $SiO_2$, 9 to 14.5% $Al_2O_3$, 17 to 24% CaO, 2 to 4% $TiO_2$, 1.5 to 4% MgO and 1 to 6% RO, wherein RO is an oxide selected from the group consisting of ZnO, SrO and BaO, calculated as ZnO. The preferred composition may also include alkali metal oxides selected from the group consisting of $Na_2O$, $K_2O$ and $Li_2O$.

11 Claims, No Drawings

GLASS COMPOSITIONS, FIBERS AND METHODS OF MAKING SAME

This application is a continuation-in-part of our copending application Ser. No. 340,982, filed Mar. 19, 1973, now U.S. Pat. No. 3,847,627, which application was a continuation-in-part of Ser. No. 298,702 filed Oct. 18, 1972, now abandoned, which was a continuation-in-part of Ser. No. 248,360, filed Apr. 28, 1972, now abandoned.

BACKGROUND OF THE INVENTION

Fiberizable glass compositions presently include boron or fluorine containing compounds as fluxing agents, which reduce the viscosity of the batch particularly during the early stages of melting. After recognition of boron and fluorine as potential pollutants, the problem has been to produce a glass composition (1) having the requisite physical properties for fiberization, (2) which is acceptable to the industry, and (3) which does not include fluorine and boron.

For example, E glass, which is the most common glass composition presently used for making textile fibers, has 9 to 11 percent by weight $B_2O_3$ and may contain fluorine as a fluxing agent. An object of the composition and method disclosed in our copending applications was to provide a substitute for E glass, while eliminating boron and fluorine. The specifications for E glass require that the percentage of alkali metal oxides, namely $Na_2O$, $K_2O$ and $Li_2O$, be less than one percent, by weight. Therefore, it is important to maintain the alkali metal oxide level of glass compositions at one percent, or less, when the glass composition is to be used in place of E glass. The composition of E glass is disclosed in U.S. Pat. No. 2,334,961, assigned to the assignee of the instant application. It has now been found that additional amounts of $Na_2O$, $K_2O$ and $Li_2O$ may be added to the glass composition of this invention without adversely affecting the physcial properties necessary for commercial fiberization.

Boron is commonly supplied in the batch composition as colemanite, anhydrous boric acid or boric acid, while fluorine is added as $CaF_2$ or sodium silicofluoride ($Na_2SiF_6$). Melting of the glass batch raw materials is gas-fired furnaces, for example, to form molten glass from which fibers may be drawn and formed includes heating the batch and molten glass to temperatures in excess of 2200° F. Commonly used textile fibers are melted in the range of 2400° to 2750° F. At these melting temperatures, $B_2O_3$ and $F_2$, or various compounds of boron and fluorine, tend to volatilize out of the molten glass and the gases can be drawn up the exhaust stacks and escape into the atmosphere surrounding the glass fiber forming area.

The resultant air and possible water pollution can be reduced or eliminated by a number of approaches. Water scrubbing or filtering of exhaust gases can often clean up exhaust air. Use of electric furnaces in place of gas-fired furnaces will virtually eliminate the losses of volatile fluxes (e.g. boron and fluorine) commonly associated with gas-fired furnaces at temperatures above 2200° F. These clean-up approaches however are often costly and can be avoided if the source of the pollutants can be removed from the glass compositions. Complicating this solution, however, is the fact that removing boron and fluorine removes two commonly used fluxing ingredients in fiberizable, textile glass compositions. Maintaining acceptable melting rates, melting and operating temperatures, liquidus and viscosity in the absence of boron and fluorine has been found to be quite difficult.

An acceptable operating range in a commercial textile glass feeder or bushing is between 2250° and 2500° F. A glass composition that will operate smoothly in this environment preferably should have a liquidus temperature of approximately 2250° F or less and a viscosity of log 2.5 poises of 2450° F., or less, such that the temperature of a viscosity of log 2.5 poises, less or minus the liquidus temperature ($\Delta T$) is 100° F. or greater.

The temperature at a viscosity of log 2.5 poises is preferably about 100° F. greater than the liquidus temperature to avoid devitrification (crystal growth) in the glass as the fibers are formed. Since devitrification causes irregularities or seeds in the glass, which hamper or may stop fiber production, the liquidus temperature of a commercial textile glass should preferably be less than about 2500° F.

The viscosity of the glass is also a key to efficient and economical fiber forming. Glass viscosities of log 2.50 poises at 2450° F, or more, require such high temperatures to melt the glass and make it flowable and formable into fibers that the metallic bushings or feeders may sag and become unusable or must be replaced or repaired more frequently than bushings contacting less viscous glasses.

It was discovered that the addition of 3 to 6% by weight $TiO_2$ to the three phase glass composition, including $SiO_2$, $Al_2O_3$ and CaO, reduced the viscosity of the molten glass to within fiberization range. The liquidus temperature was still somewhat high for conventional fiberization equipment and techniques, although glass fibers can be successfully made from the four component composition. Another problem with the four component glass composition, in certain applications, was the yellow or brown color of the fibers formed from the molten glass. The color results from the relatively high concentration of $TiO_2$ when $Fe_2O_3$ is present. Iron oxide ($Fe_2O_3$) is normally present in trace amounts from the raw materials.

The addition of 1.5 to 4% by weight MgO lowered the liquidus temperature within the fiberization range of conventional commercial fiber forming equipment and reduced the required $TiO_2$ concentration to improve the color of the fibers formed from the glass. The preferred range of $TiO_2$ in the five component glass is 3 to 5%, by weight. The color is still somewhat yellow, especially where the $TiO_2$ concentration exceeds 4%, and the liquidus temperature and viscosity are still somewhat higher then the preferred range.

It is therefore an object of the present invention to provide a boron and fluorine free glass composition which has the preferred properties of E glass, for example, including color, modulus of elasticity and tensile strength. With these problems in mind, the boron and fluorine free, fiberizable glass compositions and methods of this invention were developed.

SUMMARY OF THE INVENTION

The fiberizable glass composition of this invention is boron and fluorine free and consists essentially of, by weight, 54.5 to 60% $SiO_2$, 9 to 14.5% $Al_2O_3$, 17 to 24% CaO, 2 to 4% $TiO_2$, 1.5 to 4% MgO and 1 to 5.5% RO, wherein RO is an oxide selected from the group consisting of ZnO, SrO and BaO, calculated as ZnO. Additions of $ZrO_2$ may also be added to improve the physical properties of the glass composition. The glass composition of this invention may also include an alkali metal oxide selected from the group consisting of $Na_2O$, $K_2O$ and $Li_2O$ in alkali metal oxide equivalents, without adversely affecting the physical properties necessary for fiberization.

Alkali metal oxide equivalents, for the purpose of this specification, defines alkali metal oxides selected from the group consisting of $Na_2O$, $K_2O$, and $Li_2O$, in amounts up to 3% by weight $Na_2O$ and $K_2O$, calculated as $Na_2O$ in equivalent molecular weight percent, and up to 2% by weight $Li_2O$ and combinations thereof calculated in equivalent weight percent. If combinations of these alkali metal oxides are used, $Li_2O$ may be added in a 2/3 weight ratio to $Na_2O$. For example, the glass composition of this invention may include 1.5% by weight $Li_2O$ and up to 0.75% by weight total $Na_2O$ and $K_2O$, calculated as $Na_2O$.

It will be understood that any glass composition will contain impurities which are added to the batch with the raw materials. For example, iron as $Fe_2O_3$ will be present in trace amounts up to one percent in the sand used as a raw material. The limitation of $Fe_2O_3$ is important because it combines with $TiO_2$ to form a yellow or brown color in the resultant fiber which may create a problem in certain applications.

The addition of $TiO_2$, particularly as a substitute for $B_2O_3$ and $F_2$, to the basic three component glass composition lowers the viscosity of the glass to within the fiberization range, however the liquidus temperature still may be somewhat high, as described above, Titania ($TiO_2$) is marketed as a fine white powder, finding extensive use in paints to give opacity to enamels and the like. It is also used in glass decoration, however the use of $TiO_2$ as a substitute for $B_2O_3$ and $F_2$ to lower the viscosity of fiberizable glasses was quite unexpected.

MgO may be added to the glass composition by the raw materials and has been known to have an affect upon the melting temperature, as described in the above referenced United States patent disclosing the composition of E glass. The MgO is however substituted primarily for CaO in the five component glass and therefore the concentration of $TiO_2$ is still somewhat high, resulting in a discoloration of the glass fibers formed from the composition. Further the liquidus temperature and viscosity of the five component glass composition are still somewhat above the preferred ranges.

It has now been discovered that ZnO, SrO and BaO may be substituted for some of the $TiO_2$ in the five component glass composition to improve or eliminate the discoloration of the fibers and the addition of these oxides further lowers the liquidus temperature and viscosity within the preferred ranges for fiberization without the potential boron and fluorine.

The affect of ZnO, SrO and BaO to lower the liquidus temperature and reduce the required concentration of $TiO_2$ in the glass composition of this invention was not expected from the teaching of the prior art and is considered to be an important advancement in the production of fiberizable boron and fluorine free glass compositions.

The preferred composition of the fiberizable glass composition of this invention may also include alkali metal oxides selected from the group consisting of $Na_2O$, $K_2O$ and $Li_2O$, in alkali metal oxide equivalents, as defined above. It has been found that additions of such alkali metal oxides in greater concentrations will result in glass composition which do not have the preferred physical properties for fiberization under the present commercial conditions. Further, the disclosed composition has a viscosity within the fiberization range of log 2.5 poises at 2450° F. or less and a liquidus temperature of about 2250° F., or less. Glass compositions falling within the above range can be drawn into fine, continuous fibers having a diameter of about $15 \times 10^{-5}$ to $55 \times 10^{-5}$ inches.

DESCRIPTION OF THE INVENTION

The fiberizable, glass composition and method of this invention eliminates the potential pollutants boron and fluorine. The color of the fibers formed from the improved glass composition compares favorably with E glass, for example, and the physical properties, including the liquidus temperature and viscosity, are within the preferred ranges for fiberization. The preferred range of viscosity for the molten glass composition is log 2.5 poises at 2450° F., or less, and the glass composition preferably has a liquidus temperature of 2250° F., or less.

The fiberizable, boron and fluorine free glass composition of this invention consists essentially of, by weight 54.5 to 60% $SiO_2$, 9 to 14.5% $Al_2O_3$, 17 to 24% CaO, 2 to 4% $TiO_2$ 1.5 to 4% MgO and 1 to 5.5% RO, wherein RO is an oxide selected from the group consisting of ZnO, SrO and BaO, calculated as ZnO. The preferred concentrations of SrO and BaO in the glass composition are calculated as the molecular equivalent of ZnO, in weight percent. As described above, the preferred composition may also include an alkali metal oxide selected from the group consisting of $Na_2O$, $K_2O$ and $Li_2O$ in alkali metal oxide equivalents as defined above and may include further additions of $ZrO_2$ and $Fe_2O_3$ as described. The method of making a boron and fluorine free textile glass fiber then includes melting the glass composition of this invention to obtain a molten glass having a viscosity of log 2.5 poises at 2450° F., or less, and a liquidus temperature of about 2250° F., reducing the temperature of the molten glass to within the fiberization range and drawing a fiber. The methods of fiberizing glass are described in the prior art patents including U.S. Pat. No. 2,908,036, assigned to the assignee of the instant application. The glass composition will also include certain impurities, as described above, in trace amounts up to one percent by weight.

Specific compositions embodying the principals of this invention are described in the following Table 1, examples 1 to 38.

TABLE I

| Ingredient | Example No. 1 (% by weight) | No. 2 | No. 3 | No. 4 | No. 5 | No. 6 | No. 7 | No. 8 | No. 9 | No. 10 |
|---|---|---|---|---|---|---|---|---|---|---|
| $SiO_2$ | 57.9 | 58.9 | 57.8 | 57.8 | 57.3 | 58 | 58.3 | 57.3 | 58.6 | 57.4 |
| $Al_2O_3$ | 11.4 | 11.0 | 12 | 12.3 | 11.7 | 11.9 | 10.9 | 11.9 | 11 | 12 |
| CaO | 21.8 | 21.4 | 21.1 | 21.6 | 21.2 | 21.7 | 21.9 | 19.2 | 22 | 18.9 |
| MgO | 2.6 | 2.6 | 3.2 | 2.5 | 2.7 | 2.5 | 2.7 | 3.2 | 2.7 | 3.2 |
| BaO | — | — | — | — | 3.8 | — | — | — | — | — |
| SrO | 3.4 | — | — | — | — | — | — | — | — | — |
| ZnO | — | 2.7 | 1.3 | 2.6 | — | 2.6 | 2.8 | 3.9 | 2.8 | 3.9 |

TABLE I-continued

| Ingredient | | | | | | | | | | |
|---|---|---|---|---|---|---|---|---|---|---|
| Na₂O | 0.7 | 1 | 0.6 | 1.0 | 0.8 | 1.0 | 1.0 | 0.6 | 0.6 | 0.6 |
| K₂O | — | — | 0.05 | — | — | — | — | 0.05 | — | 0.1 |
| Li₂O | — | — | — | — | — | — | — | — | — | 0.1 |
| TiO₂ | 2.2 | 2.2 | 3.7 | 2.2 | 2.4 | 2.1 | 2.2 | 3.7 | 2.2 | 3.7 |
| Fe₂O₃ | — | 0.1 | 0.2 | 0.1 | — | 0.1 | — | 0.2 | 0.2 | 0.2 |
| Liquidus: Temp., °F. | 2175 | 2165 | 2150 | 2155 | 2170* | 2145 | 2160* | 2145 | 2155 | 2160 |
| Viscosity: Temp., °F. at log poises | | | | | | | | | | |
| 2.0 | 2594 | 2616 | 2590 | 2601 | 2616 | 2603 | 2577 | 2610 | 2590 | — |
| 2.5 | 2406 | 2412 | 2400 | 2408 | 2423 | 2409 | 2391 | 2408 | 2403 | — |
| 2.75 | 2328 | 2333 | 2320 | 2330 | 2345 | 2331 | 2314 | 2328 | 2325 | — |
| 3.0 | 2256 | 2262 | 2250 | 2258 | 2275 | 2264 | 2242 | 2255 | 2255 | — |

| Ingredient | Example No. 11 (% by weight) | No. 12 | No. 13 | No. 14 | No. 15 | No. 16 | No. 17 | No. 18 | No. 19 | No. 20 |
|---|---|---|---|---|---|---|---|---|---|---|
| SiO₂ | 57.1 | 57.7 | 57.7 | 58.3 | 58.2 | 57.8 | 58.5 | 57.3 | 58.1 | 57.6 |
| Al₂O₃ | 11.9 | 11.4 | 11.7 | 11.6 | 11.6 | 11.5 | 11.6 | 12.2 | 11.5 | 11.4 |
| CaO | 18.2 | 22.9 | 21.4 | 21.8 | 21.7 | 21.6 | 21.8 | 21.7 | 21.7 | 21.5 |
| MgO | 3.2 | 2.8 | 2.8 | 2.0 | 2.0 | 2.0 | 2.0 | 1.8 | 2.0 | 2.0 |
| BaO | — | — | 3.9 | — | — | — | — | — | — | — |
| SrO | — | — | — | — | — | — | — | — | — | — |
| ZnO | 5.2 | 2.8 | — | 2.9 | 2.9 | 3.9 | 2.0 | 2.7 | 2.9 | 3.9 |
| Na₂O | 0.7 | — | — | 1.0 | 1.0 | 1.0 | 0.5 | 0.9 | 1.0 | 1.0 |
| K₂O | 0.1 | — | — | — | — | — | — | — | — | — |
| Li₂O | — | — | — | — | — | — | 0.2 | — | — | — |
| TiO₂ | 3.6 | 2.3 | 2.4 | 2.3 | 2.5 | 2.3 | 2.3 | 3.3 | 2.8 | 2.5 |
| Fe₂O₃ | 0.2 | 0.1 | 0.1 | 0.1 | 0.1 | 0.1 | 0.1 | 0.1 | 0.13 | 0.13 |
| Liquidus: Temp., °F. | 2135 | 2165 | 2155 | 2135 | 2125 | 2110 | 2105 | 2100 | 2130 | 2105 |
| Viscosity: Temp., °F. at Log Poise | | | | | | | | | | |
| 2.0 | — | 2580 | 2623 | 2643 | 2604 | 2600 | 2605 | 2620 | 2600 | 2585 |
| 2.5 | — | 2389 | 2433 | 2445 | 2410 | 2408 | 2404 | 2420 | 2400 | 2393 |
| 2.75 | — | 2311 | 2358 | 2362 | 2323 | 2322 | 2332 | 2337 | 2320 | 2318 |
| 3.0 | — | — | 2282 | 2288 | 2247 | 2255 | 2261 | 2265 | 2255 | 2243 |

| Ingredient | Example No. 21 (% by weight) | No. 22 | No. 23 | No. 24 | No. 25 | No. 26 | No. 27 | No. 28 | No. 29 |
|---|---|---|---|---|---|---|---|---|---|
| SiO₂ | 57.9 | 54.6 | 56.2 | 57.0 | 58.3 | 58.0 | 57.8 | 57.5 | 57.2 |
| Al₂O₃ | 11.5 | 11.3 | 11.7 | 11.1 | 10.9 | 10.9 | 10.8 | 10.8 | 10.7 |
| CaO | 21.3 | 17.4 | 17.9 | 20.5 | 21.9 | 21.8 | 21.7 | 21.6 | 21.5 |
| MgO | 2.0 | 3.1 | 3.2 | 3.6 | 2.7 | 2.7 | 2.7 | 2.6 | 2.6 |
| BaO | — | 9.3 | — | — | — | — | — | — | — |
| SrO | — | — | 6.5 | — | — | — | — | — | — |
| ZnO | 3.9 | — | — | 2.7 | 2.8 | 2.8 | 2.8 | 2.7 | 2.7 |
| Na₂O | 0.48 | 0.8 | 0.8 | 0.7 | 1.0 | 1.5 | 2.0 | 2.4 | 2.9 |
| K₂O | 0.02 | — | — | — | — | — | — | — | — |
| Li₂O | 0.23 | — | — | — | — | — | — | — | — |
| TiO₂ | 2.3 | 3.4 | 3.5 | 2.2 | 2.2 | 2.2 | 2.2 | 2.2 | 2.2 |
| Fe₂O₃ | 0.13 | 0.13 | 0.13 | 0.21 | 0.13 | 0.13 | 0.13 | 0.13 | 0.13 |
| Liquidus: Temp., °F. | 2105 | 2175 | 2180 | 2230 | 2170 | 2196 | 2216 | 2237 | 2245 |
| Viscosity: Temp., °F. At Log Poise | | | | | | | | | |
| 2.0 | 2586 | — | 2590 | 2625 | 2585 | 2585 | 2561 | 1549 | 2540 |
| 2.25 | — | — | — | — | 2485 | 2475 | 2463 | 2450 | 2435 |
| 2.50 | 2392 | 2413 | 2403 | 2360 | 2390 | 2380 | 2365 | 2357 | 2345 |
| 2.75 | 2314 | 2332 | 2325 | 2292 | 2310 | 2303 | 2285 | 2275 | 2267 |
| 3.00 | 2249 | 2266 | 2251 | 2242 | 2239 | 2232 | 2215 | 2204 | 2192 |

| Ingredient | Example No. 30 (% by weight) | No. 31 | No. 32 | No. 33 | No. 34 | No. 35 | No. 36 | No. 37 | No. 38 |
|---|---|---|---|---|---|---|---|---|---|
| SiO₂ | 56.8 | 56.5 | 56.3 | 58.4 | 57.8 | 57.6 | 57.3 | 56.9 | 58.0 |
| Al₂O₃ | 12.4 | 12.4 | 12.3 | 10.9 | 10.8 | 10.7 | 10.7 | 10.7 | 14.1 |
| CaO | 21.4 | 21.3 | 21.2 | 21.9 | 21.7 | 21.6 | 21.5 | 21.4 | 22.0 |
| MgO | 2.6 | 2.6 | 2.6 | 2.7 | 2.7 | 2.7 | 2.7 | 2.6 | 0.3 |
| ZnO | 2.6 | 2.6 | 2.6 | 2.8 | 2.7 | 2.7 | 2.7 | 2.7 | — |
| Na₂O | — | — | — | 0.1 | 0.1 | 0.1 | 0.1 | 3.4 | 0.2 |
| K₂O | — | — | — | 1.0 | 2.0 | 2.5 | 3.0 | — | — |
| Li₂O | 2.0 | 2.4 | 2.9 | — | — | — | — | — | 1.5 |
| TiO₂ | 2.0 | 2.0 | 2.0 | 2.2 | 2.2 | 2.2 | 2.2 | 2.2 | 3.7 |
| Fe₂O₃ | 0.16 | 0.16 | 0.16 | 0.1 | 0.1 | 0.1 | 0.1 | 0.1 | 0.2 |
| Liquidus: Temp., °F | 2126 | 2115 | 2093 | 2192 | 2224 | 2233 | 2255 | 2273 | 2130 |
| Viscosity: Temp., °F | | | | | | | | | |
| 2.0 | 2435 | 2389 | 2355 | 2625 | 2625 | 2618 | 2617 | 2525 | 2570 |
| 2.25 | 2332 | 2286 | 2255 | 2515 | 2523 | 2515 | 2515 | 2420 | — |
| 2.50 | 2240 | 2197 | 2165 | 2423 | 2432 | 2425 | 2421 | 2326 | 2365 |
| 2.75 | 2163 | 2123 | 2090 | 2343 | 2350 | 2345 | 2341 | 2250 | — |
| 3.00 | 2092 | 2051 | — | 2270 | 2275 | 2270 | 2273 | 2181 | 2210 |

*Average of two liquidus determinations.

The viscosity determinations in Examples 1 through 38 were obtained using the apparatus and procedure described in U.S. Pat. No. 3,056,283 and in the article in *The Journal of the American Ceramic Society*, Vol. 42, No. 11, Nov. 1959, pages 537–541. The article is entitled "Improved Apparatus for Rapid Measurement of Viscosity of Glass at High Temperatures" by Ralph L. Tiede. Other specific viscosity determinations referred to herein also would be measured by the apparatus and procedures in the Tiede article.

The glass compositions of this invention, some of which are described in Table 1, Examples 1 through 38, have a liquidus temperature of 2250° F., or less and a viscosity of log poise 2.50 (i.e. $10^{2.50}$ poises) at about 2450° F., or less. Examples 1 to 24 of Table 1 contain one percent by weight or less of the alkali metal oxides, as described above and thus these glasses in fiber form will be acceptable to consumers requiring low levels of the alkali metal oxides.

Examples 25 to 38 include $Na_2$, $K_2O$ and $Li_2O$ in concentrations of between 1 and 3% by weight. It has now been found that the addition of such alkali metal oxides in the stated range does not adversely affect the physical properties necessary for fiberization under present known commercial techniques. The compositions of Examples 31, 32 and 37 illustrate the effect of concentrations of alkali metal oxides greater than permissable under present commercial conditions. It will be seen that the composition of Examples 31 and 32 have a concentration of greater than two percent by weight $Li_2O$ and the composition of Example 37 has a concentration of greater than three percent by weight $Na_2O$. Further, $\Delta T$ (the temperature at a viscosity of log 2.5 poises minus the liquidus temperature) is less than 100° F. in these Examples. Therefore, where the concentration of such alkali metal oxides is greater than about 3% by weight $Na_2O$ and $K_2O$ and 2% by weight $Li_2O$, as defined, $\Delta T$ will be less than 100° F. and devitrification of the glass during fiberization may result as described above.

$TiO_2$ (titania) is used in the glass composition of this invention as a flux in place of boron and fluorine. The titania, as described above, reduces the viscosity in these compositions without adversely affecting the liquidus temperature. $TiO_2$ should be used in these compositions in amounts of 4% by weight, or less, preferably less than 3.5%. Concentrations of titania above about 6% causes the liquidus temperature to reach undesirable levels. Further, concentrations of $TiO_2$ above 4% also causes a brownish or yellowish coloration to the glass fibers. This can be a problem where the fibers are combined with a clear matrix material and are visible in the final product. Clear plastic panels or clear plastic fishing rods are examples of products that might be less desirable if tinted fibers are utilized. The concentration of Mgo glass composition is less than 4% by weight. Concentrations of MgO above 4% increases the liquidus temperature above the preferred limit for fiberization.

Zinc oxide (ZnO) is normally produced by direct oxidation of the metal and subsequently purified by sublimation. It is preferred in a number of grades based on color, particle size and smoothness of texture. The use of ZnO in glass compositions was limited due to its refractory nature and its considered tendency to increase the melting temperature of the glass. Barium oxide (BaO) is usually furnished by the compound barium carbonate ($BaCO_3$), although it occurs naturally as the mineral witherite which is seldom pure enough for use in glass manufacture. The preferred glass composition may also include 0.5 to 2% by weight $ZrO_2$ to improve the chemical durability of fibers formed from the glass compositions.

The alkali metal oxides ($Li_2O$, $Na_2O$ and $K_2O$) are used in some compositions to control the viscosity. When $Na_2O$, $K_2O$ and $Li_2O$ are combined, $K_2O$ should be used in amounts, that, when calculated as $Na_2O$ will total less than about three percent, by weight, in molecular weight percent. $Li_2O$ may be added in a 2/3 weight ratio to $Na_2O$, as described.

As described above, $Fe_2O_3$ may be included within the disclosed glass compositions as an impurity of the batch raw materials or it may be added intentionally in amounts up to one percent by weight. $Fe_2O_3$ can, however, discolor the glass fibers drawn from the glass, particularly in combination with $TiO_2$ and the glass compositions in amounts of about 0.3% or less by weight, without adversely affecting the glasses or fibers. These impurities will include chromic oxide ($Cr_2O_3$), oxides of vanadium, sulfates and phosphates. These impurities can enter the glass as raw material impurities or can be products formed by the chemical reaction of the molten glass with the furnace components.

Modifications and variations within the scope of the appended claims are intended to be included.

We claim:

1. A boron and fluorine free fiberizable glass composition having a liquidus temperature of about 2250° F., or less and having a viscosity of log 2.5 poises at about 2450° F., or less, consisting essentially by weight of 54.5 to 60% $SiO_2$, 9 to 14.5% $Al_2O_3$, 17 to 24% CaO, 2 to 4% $TiO_2$, 1.5 to 4% MgO, 1 to 6% RO, wherein R is selected from the group consisting of Zn, Sr and Ba and RO is calculated as the equivalent molecular weight percent of ZnO and an alkali metal oxide selected from the group consisting of $Na_2O$, $K_2O$ and $Li_2O$, comprising between 1% and 3% $Na_2O$ and $K_2O$, the $K_2O$ calculated as $Na_2O$ in equivalent weight percent and between 1% and 2% by weight $Li_2O$, and combinations of such alkali metal oxides in equivalent total weight percent, the total $Na_2O$, $K_2O$, and $Li_2O$ not exceeding 3% by weight.

2. A boron and fluorine free fiberizable glass composition having a liquidus temperature of about 2250° F., or less and having a viscosity of log 2.5 poises at about 2450° F., or less, consisting essentially by weight of 54.5 to 60% $SiO_2$, 9 to 14.5% $Al_2O_3$, 17 to 24% CaO, 2 to 4% $TiO_2$, 1.5 to 4% MgO, 1 to 6% RO, wherein R is selected from the group consisting of Zn, Sr and Ba, and RO is calculated as the equivalent molecular weight percent of ZnO and alkali metal oxide selected from the group consisting of $Na_2O$ and $K_2O$ and $Li_2O$, comprising up to 3% by weight $Na_2O$ and $K_2O$, calculated as $Na_2O$ in equivalent molecular weight percent, up to 2% by weight $Li_2O$ and combinations thereof calculated in equivalent weight percent.

3. A boron and fluorine free fiberizable glass composition having a liquidus temperature of 2250° F., or less and having a viscosity of log 2.5 poises at 2450° F., or less, consisting essentially of, by weight, 54.5 to 60% $SiO_2$, 9 to 14.5% $Al_2O_3$, 17 to 24% CaO, 2 to 4% $TiO_2$, 1.5 to 4% MgO, 1 to 6% RO, wherein RO is an oxide selected from the group consisting of ZnO SrO and BaO, calculated as ZnO and an alkali metal oxide selected from the group consisting of $Na_2O$, $K_2O$ and $Li_2O$, comprising 3% by weight or less $Na_2O$ and $K_2O$, calculated as $Na_2O$ in equivalent molecular weight percent, 2% by weight or less $Li_2O$ and combinations thereof calculated in equivalent weight percent.

4. A boron and fluorine free fiberizable glass composition having a liquidus temperature of 2250° F., consisting essentially of, by weight, 54.5 to 60% $SiO_2$, 9 to 14.5% $Al_2O_3$, 17 to 24% CaO, 2 to 4% $TiO_2$, 1.5 to 4% MgO, 1 to 6% RO, wherein RO is an oxide selected from the group consisting of ZnO, SrO and BaO, calculated as ZnO in equivalent molecular weight percent and an alkali metal oxide selected from the group consisting of $Na_2O$, $K_2O$ and $Li_2O$, comprising between 1% and 3% $Na_2O$ and $K_2O$, the $K_2O$ calculated as $Na_2O$ in equivalent weight percent and between 1% and 2% by weight $Li_2O$, and combinations of such alkali metal oxides in equivalent total weight percent, the total $Na_2O$, $K_2O$ and $Li_2O$ not exceeding 3%.

5. The method of making a boron and fluorine free glass fiber, comprising the steps of melting a glass batch consisting essentially of, by weight, 54.5 to 60% $SiO_2$, 9 to 14.5% $Al_2O_3$, 17 to 24% CaO, 2 to 4% $TiO_2$, 1.5 to 4% MgO, the equivalent of 1 to 6% of the oxide RO, wherein RO is selected from the group consisting of ZnO, SrO, and BaO, calculated as ZnO in molecular weight percent and alkali metal oxide selected from the group consisting of $Na_2O$, $K_2O$ and $Li_2O$, comprising up to 3% by weight $Na_2O$ and $K_2O$, calculated as $Na_2O$ in equivalent molecular weight percent, up to 2% by weight $Li_2O$ and combinations thereof calculated in equivalent weight percent, reducing the temperature of the molten glass to within the fiberization range of the glass composition having a liquidus temperature of about 2250° F., or less and having a viscosity of log 2.5 poises at about 2450° F., or less and drawing a glass fiber.

6. The method of making a boron and fluorine free glass fiber, comprising the steps of melting a glass batch consisting essentially of, by weight, 54.5 to 60% $SiO_2$, 9 to 14.5% $Al_2O_3$, 17 to 24% CaO, 2 to 4% $TiO_2$, 1.5 to 4% MgO, the equivalent of 1 to 6 percent of the oxide RO, wherein RO is selected from the group consisting of ZnO, SrO and BaO, calculated as ZnO in molecular weight percent and an alkali metal oxide selected from the group consisting of $Na_2O$, $K_2O$ and $Li_2O$, comprising between 1% and 3% $Na_2O$ and $K_2O$, the $K_2O$ calculated as $Na_2O$ in equivalent weight percent and between 1% and 2% by weight $Li_2O$, and combinations of such alkali metal oxides in equivalent, total weight percent, reducing the temperature of the molten glass to within the fiberization range of the glass composition having a liquidus temperature of about 2250° F., or less and drawing a glass fiber.

7. A boron and fluorine free textile glass fiber consisting essentially of:

| COMPONENT | PERCENT BY WEIGHT |
|---|---|
| $SiO_2$ | 54.5 to 60 |
| $Al_2O_3$ | 9 to 14.5 |
| CaO | 17 to 24 |
| $TiO_2$ | 2 to 4 |
| MgO | 1.5 to 4 |
| RO | 1 to 5.5 |
| $Fe_2O_3$ | 0 to 1 | wherein RO is an oxide selected from the group consisting of ZnO, SrO and BaO and the concentration of RO is calculated as ZnO in molecular weight percent and an alkali metal oxide selected from the group consisting of $Na_2O$, $K_2O$ and $Li_2O$, comprising up to 3% by weight $Na_2O$ and $K_2O$, calculated as $Na_2O$ in equivalent molecular weight percent, up to 2% by weight $Li_2O$ and combinations thereof calculated in equivalent weight percent.

8. A boron and fluorine free textile glass fiber consisting essentially of:

| COMPONENT | PERCENT BY WEIGHT |
|---|---|
| $SiO_2$ | 54.5 to 60 |
| $Al_2O_3$ | 9 to 14.5 |
| CaO | 17 to 24 |
| $TiO_2$ | 2 to 4 |
| MgO | 1.5 to 4 |
| RO | 1 to 5.5 |
| $Fe_2O_3$ | 0 to 1 | wherein RO is an oxide selected from the group consisting of ZnO, SrO, and BaO and the concentration of RO is calculated as ZnO in molecular weight percent, an alkali metal oxide selected from the group consisting of $Na_2O$, $K_2O$, and $Li_2O$, comprising between 1% and 3% $Na_2O$ and $K_2O$, the $K_2O$ calculated as $Na_2O$ in equivalent weight percent and between 1% and 2% by weight $Li_2O$, and combinations of such alkali metal oxides in equivalent total weight percent, the total $Na_2O$, $K_2O$ and $Li_2O$ not exceeding 3% by weight.

9. A fiberizable, boron and fluorine free glass composition consisting essentially of, by weight:

| COMPONENT | PERCENT BY WEIGHT |
|---|---|
| $SiO_2$ | 54.5 to 60 |
| $Al_2O_3$ | 9 to 14.5 |
| CaO | 17 to 24 |
| $TiO_2$ | 2 to 4 |
| MgO | 1.5 to 4 |
| RO | 1 to 5.5 |
| $Fe_2O_3$ | 0 to 1 | wherein RO is an oxide selected from the group consisting of ZnO, SrO and BaO and the concentration of RO is calculated as ZnO in equivalent molecular weight percent, an alkali metal oxide selected from the group consisting of $Na_2O$, $K_2O$ and $Li_2O$, comprising 3% by weight or less $Na_2O$ and $K_2O$, calculated as $Na_2O$ in equivalent molecular weight percent, 2% by weight or less $Li_2O$ and combinations thereof calculated in equivalent weight percent, and said composition having a liquidus temperature of 2250° F., or less and a viscosity of log 2.5 poises at 2450° F., or less.

10. A fiberizable, boron and fluorine free glass composition consisting essentially of, by weight:

| COMPONENT | PERCENT BY WEIGHT |
|---|---|
| SiO | 54.5 to 60 |
| $Al_2O$ | 9 to 14.5 |
| CaO | 17 to 24 |
| $TiO_2$ | 2 to 4 |
| MgO | 1.5 to 4 |
| RO | 1 to 5.5 |
| $Fe_2O_3$ | 0 to 1 | wherein RO is an oxide selected from the group consisting of ZnO, SrO and BaO and the concentration of RO is calculated as ZnO an equivalent molecular weight percent, an alkali metal oxide selected from the group consisting of $Na_2O$, $K_2O$ and $Li_2O$, comprising between 1% and 3% $Na_2O$ and $K_2O$, the $K_2O$ calculated as $Na_2O$ in equivalent weight percent and between 1% and 2% by weight $Li_2O$, and combinations of such alakli metal oxides in equivalent total weight percent and said composition having a liquidus temperature of 2250° F., or less and a viscosity of log 2.5 poises at 2450° F., or less.

11. The fiberizable boron and fluorine free glass composition defined in claim 10, wherein said composition includes 0.5 to 2% by weight $ZrO_2$ to improve the chemical durability of fibers formed from the glass composition.

* * * * *